(12) United States Patent
Gayral Chirac et al.

(10) Patent No.: US 9,249,349 B2
(45) Date of Patent: Feb. 2, 2016

(54) PROCESS FOR DRILLING SUBTERRANEAN CAVITIES

(75) Inventors: Marie-Francoise Gayral Chirac, Viviers-les-Montagnes (FR); Jerome Guilbot, Castres (FR); Andre Benattar, Castres (FR)

(73) Assignee: SOCIETE D'EXPLOITATION DE PRODUCTS POUR LES INDUSTRIES CHIMIQUES SEPPIC, Paris (FR)

( * ) Notice: Subject to any disclaimer, the term of this patent is extended or adjusted under 35 U.S.C. 154(b) by 295 days.

(21) Appl. No.: 13/992,320

(22) PCT Filed: Dec. 13, 2011

(86) PCT No.: PCT/FR2011/052960
§ 371 (c)(1),
(2), (4) Date: Jun. 7, 2013

(87) PCT Pub. No.: WO2012/085391
PCT Pub. Date: Jun. 28, 2012

(65) Prior Publication Data
US 2013/0252853 A1 Sep. 26, 2013

(30) Foreign Application Priority Data

Dec. 23, 2010 (FR) ...................................... 10 61141

(51) Int. Cl.
*C09K 8/38* (2006.01)
*C09K 8/52* (2006.01)
*C09K 8/70* (2006.01)

(52) U.S. Cl.
CPC ... *C09K 8/38* (2013.01); *C09K 8/52* (2013.01); *C09K 8/703* (2013.01)

(58) Field of Classification Search
None
See application file for complete search history.

(56) References Cited

U.S. PATENT DOCUMENTS

| | | | | |
|---|---|---|---|---|
| 3,313,362 A | * | 4/1967 | Schneider | ...................... 175/71 |
| 4,461,716 A | | 7/1984 | Barbarin et al. | |
| 5,000,877 A | * | 3/1991 | Kanekiyo et al. | ............. 510/434 |
| 6,172,010 B1 | | 1/2001 | Argillier et al. | |
| 2004/0077518 A1 | * | 4/2004 | Nishikawa et al. | ........... 510/499 |
| 2008/0011486 A1 | | 1/2008 | Zhang et al. | |
| 2010/0069269 A1 | | 3/2010 | Prat et al. | |

FOREIGN PATENT DOCUMENTS

| | | |
|---|---|---|
| FR | 2 439 230 | 5/1980 |
| FR | 2 690 709 | 11/1993 |
| FR | 2 757 426 | 6/1998 |
| FR | 2 913 350 | 9/2008 |
| WO | 93/22538 | 11/1993 |
| WO | 98/09611 | 3/1998 |
| WO | 03/035794 | 5/2003 |

OTHER PUBLICATIONS

Sivasamy et al.,"Preparation, Characterization, and Surface and Biological Properties of N-Stearoyl Amino Acids", Ch. Eng. Div., Central Leather Research Institute, 2001, p. 897-902.*
International Search Report dated Apr. 23, 2012, corresponding to PCT/FR2011/052960.

* cited by examiner

*Primary Examiner* — Randy Gulakowski
*Assistant Examiner* — Jeffrey Washville
(74) *Attorney, Agent, or Firm* — Young & Thompson

(57) ABSTRACT

A process for drilling cavities in subterranean formations includes a step of removal of the drill cuttings using an aqueous fluid in the form of a foam, obtained by mixing: an aqueous composition (Ci) including, per 100% by weight: from 0.5% by weight to 25% by weight of a compound of formula (I): $R_1$—C(O)—NH—CH(COOM)-$(CH_2)_n$—COOM' (I) in which n represents an integer equal to 1 or 2, $R_1$ represents a linear or branched, saturated or unsaturated aliphatic hydrocarbon-based radical including from eight to eighteen carbon atoms, M represents a monovalent cation and M', which is identical to or different from M, represents a hydrogen atom or a monovalent cation; or of a mixture of compounds of formula (I), and from 75% to 99.5% by weight of water, with a gas or a mixture of gases, chosen from air, nitrogen or carbon dioxide.

11 Claims, No Drawings

PROCESS FOR DRILLING SUBTERRANEAN CAVITIES

The present invention relates to a process for drilling cavities in subterranean formations, using a step of disposing of the drill cuttings by means of a foam.

The processes for drilling cavities in subterranean formations, in vertical or oblique directions, such as for example the processes for drilling oil wells, gas wells, water wells or mining wells, or in horizontal directions, such as for example the processes for drilling tunnels or mining galleries, using steps of disposing of the drill cuttings with aqueous foams obtained by activation of a surfactant that foams in aqueous solution. These foams have the advantage of forming a good support for the cuttings, so as not to induce too large a bottom hole pressure owing to low densities, which thus limits the risks of damaging the subterranean formation.

In the case of processes for drilling cavities in subterranean formations along horizontal directions, such as for example the processes for drilling tunnels or mining galleries, use is commonly made of machines referred to as tunnel boring machines, which are capable of drilling a tunnel or a gallery, the diameter of which corresponds to close to the final diameter of the works to be produced. These drilling processes, and especially drilling processes using confining tunnel boring machines intended to operate in soils of mediocre bearing capacities (such as for example alluvial soils, sands and clays) or aquifers, using aqueous foams to fluidize the drill cuttings and to enable their disposal from the drilling zone. These drilling processes also make it possible to improve the permeability of the soil, and consequently to reduce the intensity of the friction forces that are exerted on the drilling machine and therefore to slow down the wear of said drilling machine.

The foams used in these processes must be very stable and have a high breaking capacity, this being in order to limit the amount used, enable an effective separation of the cuttings on return to the surface, and of an aqueous solution capable of being reactivated as foam for a new drilling operation.

The breaking of the foam on return to the surface is carried out either by the addition of antifoaming agents, or by modifying the pH of the aqueous foam. In the latter case, if the foam is basic or neutral, it is broken by reducing the pH to a value of less than or equal to 4.5 by addition of an acid agent to the aqueous solution; or by increasing the value of the pH up to at least 9.5 by addition of an alkaline agent to the aqueous solution.

Foams are formed by an assembly of gaseous cells separated by thin films of liquids, and are formed by the juxtaposition of bubbles that a gas dispersed in a liquid generates. They are generally prepared from aqueous compositions comprising at least one foaming surfactant by mixing with a gas, such as for example air or nitrogen or carbon dioxide. Certain surfactants are known for generating foams by mixing with gases. However, the mechanical properties of these foams are different depending on the nature of said surfactants. Thus, in order to obtain high-stability foams, which are characterized by a high foam viscosity and a long life, the person skilled in the art must combine the surfactant with one or more additives having the effect of increasing the rigidity of the structure of the gaseous cells.

The French patent application published under the number 2 439 230 discloses the use of fatty amines as a foaming auxiliary, and of aqueous solutions of surfactants such as alkyl betaines, alkylamido betaines, alkyl sulfates or alkyl ether sulfates.

The international application published under the number WO 93/22538 A1 describes a tunnel excavation process that is characterized by the injection of a foam at the front of the cutting disk or of the confinement chamber of the drilling machine, generated by activation of a foaming surfactant in an aqueous solution in the presence of a foaming auxiliary selected from the group consisting of fatty amines, fatty alcohols, fatty alkanolamides or tertiary amine oxides.

The international application published under the number WO 03/035794 A1 describes a well drilling method comprising a step of disposing of the drill cuttings by means of an aqueous drilling fluid such as a foam comprising a foaming agent comprising at least one optionally polyethoxylated fatty monoalkyl phosphate, then making it possible to generate the foam under slightly acid or alkaline conditions and to destroy it under acid conditions. WO 03/035794 A1 also teaches increasing the stability of the foam obtained by the use of at least one mono-(aliphatic hydrocarbyl)phosphate ester via the addition of a foam stabilizer.

However, these foam stabilizer additives are often not very biodegradable and are sometimes toxic, which makes them not in compliance with the new regulatory provisions as regards the environment.

In addition, they cannot be used in sensitive geological zones, such as for example those containing water tables of drinking water, or protected geographical zones.

The United States patent application published under the number US 2008/0011486 discloses the use of a foam of aqueous solutions of alkyl polyglucosides, which are biodegradable surfactants, for well drilling operations. However, the foams generated by these surfactants do not have sufficiently satisfactory mechanical and stability properties.

The applicant has endeavored to develop a novel technical solution relating to a drilling process that comprises a step of disposing of cuttings using a foam obtained by activation of an N-acyl amino acid, the acyl group being derived from a fatty acid, without addition of a stabilizer additive, and that thus makes it possible to overcome the drawbacks set out above.

This is why the subject of the invention is a process for drilling cavities in subterranean formations comprising a step of disposing of the drill cuttings using an aqueous fluid, in the form of a foam, obtained by mixing:

an aqueous composition ($C_1$) comprising, for 100% by weight:
  from 0.5% by weight to 25% by weight of a compound of formula (I):

$$R_1-C(O)-NH-CH(COOM)-(CH_2)_n-COOM' \quad (I)$$

in which n represents an integer equal to 1 or 2, $R_1$ represents a saturated or unsaturated, linear or branched, aliphatic hydrocarbon-based radical comprising from 8 to 18 carbon atoms, M represents a monovalent cation and M', which is identical to or different from M, represents a hydrogen atom or a monovalent cation; or a mixture of compounds of formula (I), and
  from 75% to 99.5% by weight of water,
with a gas or a mixture of gases, chosen from air, nitrogen or carbon dioxide.

In the process as defined above, the aqueous fluid is generally prepared at the wellhead by mixing said aqueous composition ($C_1$) and the gas or the mixture of gases, using a suitable commercially-available device. The foam thus obtained is then conveyed into the well by pumping inside pipes, joined together in a column which is dropped into the well to the level of the drilling zone, in order to be injected into this drilling zone, generally in the middle of the drill string. The foam is returned to the surface through an annular space defined by the pipes described previously and by the walls of the well, carrying the drilling cuttings to the surface. The cuttings are then separated from the foam in order to be disposed of.

According to one particular aspect of the process as defined previously, the aqueous composition ($C_1$) comprises, for 100% by weight, from 0.5% by weight to 15% by weight of a compound of formula (I) as defined above, or of a mixture of compounds of formula (I), and from 85% to 99% by weight of water.

According to one more particular aspect of the process as defined previously, the aqueous composition ($C_1$) comprises, for 100% by weight, from 0.5% by weight to 5% by weight of a compound of formula (I) as defined above, or of a mixture of compounds of formula (I), and from 95% to 99.5% by weight of water.

According to one particular aspect of the process as defined previously, in the formula (I) n is equal to 1.

According to another particular aspect of the process as defined previously, in the formula (I), n is equal to 2.

According to one particular aspect of the process as defined previously, the aqueous composition ($C_1$) comprises a non-zero proportion of at least one compound of formula (I), wherein n is equal to 1 and a non-zero proportion of at least one compound of formula (I), wherein n is equal to 2.

In the process as defined previously, the compound of formula (I) as defined above may be in partially or completely salified form.

According to another particular aspect of the process as defined previously, in the formula (I), M and M' represent a sodium atom or a potassium atom.

The compounds of formula (I) as described previously are generally obtained by N-acylation of the corresponding amino acids or salts thereof.

The acylation reaction is known to a person skilled in the art. It is described, for example, in the international application published under the number WO 98/09611. It is carried out either on an amino acid or on a mixture of amino acids. The acylation agent generally consists of an activated derivative of a carboxylic acid of formula:

$$R_1-C(=O)-OH,$$

in which $R_1$ is as defined previously, such as a symmetrical anhydride of this acid, the methyl ester of this acid, or an acid halide such as the acid chloride or the acid bromide. It may also consist of a mixture of activated derivatives of carboxylic acids derived from natural oils or fats of animal or plant origin such as coprah oil, coconut oil, palm kernel oil, palm oil, soybean oil, rapeseed oil, corn oil, beef tallow, sperm oil or herring oil. Within the context of the present invention, use is preferably made of mixtures of fatty acids derived from coprah oil, palm kernel oil, coconut oil or sperm oil which contain a predominant fraction of dodecanoic acid, the compositions of which are described in the table below (as percentages by weight):

|  | Coprah oil | Palm kernel oil | Sperm oil | Coconut oil |
| --- | --- | --- | --- | --- |
| Octanoic or caprylic acid ($C_8H_{16}O_2$) | 6% to 9% | 3% to 10% | — | 2% to 10% |
| Decanoic or capric acid ($C_{10}H_{20}O_2$) | 6% to 10% | 3% to 14% | 1% to 3% | 3% to 9% |
| Dodecanoic or lauric acid ($C_{12}H_{24}O_2$) | 44% to 51% | 37% to 52% | 14% to 38% | 45% to 56% |
| Tetradecanoic or myristic acid ($C_{14}H_{28}O_2$) | 13% to 18% | 7% to 17% | 12% to 14% | 15% to 23% |
| Hexadecanoic or palmitic acid ($C_{16}H_{32}O_2$) | 8% to 10% | 2% to 9% | 8% to 10% | 7% to 14% |
| Octadecanoic or stearic acid ($C_{18}H_{36}O_2$) | 1% to 3% | 1% to 3% | 1% to 3% | 1% to 7% |
| Octadecenoic or oleic acid ($C_{18}H_{34}O_2$) | 5.5% to 7.5% | 11% to 23% | 15% to 18% | 3% to 11% |
| Eicosenoic or gadoleic acid ($C_{20}H_{38}O_2$) | — | — | 5% to 8% | — |
| Octadecadienoic or linoleic acid ($C_{18}H_{32}O_2$) | <2.5% | 1% to 3% | — | ≤3% |
| other acids | <0.4% | <0.6% | 26% to 34% | <3% |

When the compound of formula (I) is in partially salified form, M represents a monovalent cation and M' represents a hydrogen atom.

When the compound of formula (I) is in completely salified form, M and M', which are identical or different, represent a monovalent cation.

The expression "monovalent cation" denotes that a cation is selected for M and/or M' which is chosen from the ammonium ion, a monovalent cation of alkali metals, such as for example the sodium, potassium or lithium cation, a monovalent cation of an alkanolamine, for example the (2-hydroxyethyl)ammonium cation, the bis(2-hydroxyethyl)ammonium cation, the tris(2-hydroxy-ethyl)ammonium cation, the ammonium cation of monoiso-propanolamine, the ammonium cation of 2-(2-amino-ethoxy)ethanol, the ammonium cation of 2-(2-aminoethyl-amino)ethanol or the ammonium cation of 2-(methyl-amino)ethanol.

According to one particular aspect of the process as defined previously, in the formula (I), M represents a sodium or potassium atom and M' represents a hydrogen atom.

According to one particular aspect of the present invention, the subject of which is a process as defined previously, characterized in that, in the formula (I), the $R_1$ radical represents an alkyl radical chosen from heptyl, nonyl, undecyl, tridecyl or pentadecyl radicals and more particularly the process for which the aqueous composition ($C_1$) comprises, for 100% by weight:

from 0.5% by weight to 25% by weight of a mixture of compounds of formula (I):

$$R_1-C(O)-NH-CH(COOM)-(CH_2)_n-COOM' \qquad (I)$$

obtained by acylation of a compound of formula (II):

$$NH_2-CH(COOM)-(CH_2)_n-COOM' \qquad (II)$$

wherein n represents an integer equal to 1 or 2, M represents a monovalent cation and M', which is identical to or different from M, represents a hydrogen atom or a monovalent cation, with a mixture of fatty acids derived from coconut oil or with a mixture of activated derivatives of said acids; and from 75% to 99.5% by weight of water.

According to another aspect, the process as defined previously is characterized in that the mixture of compounds of formula (I) is chosen from the monosodium salt or monopotassium salt of N-cocoylglutamic acid, or the monosodium salt or monopotassium salt of N-cocoylaspartic acid, or in that the mixture of compounds of formula (I) is chosen from the disodium salt or dipotassium salt of N-cocoylglutamic acid, or the disodium salt or dipotassium salt of N-cocoylaspartic acid.

According to another aspect of the process as defined previously, the aqueous composition ($C_1$) also comprises, for 100% of its weight, from 0.5% by weight to 15% by weight and more particularly from 0.5% by weight to 10% by weight, of at least one surfactant different from the compound of formula (I), chosen from nonionic surfactants, anionic surfactants, cationic surfactants and amphoteric surfactants.

Among the nonionic surfactants included in the aqueous composition ($C_1$), mention will particularly be made of alkyl polyglycosides, alkoxylated derivatives of castor oil, sorbitan esters, mannitan esters, alkoxylated sorbitan esters such as for example ethoxylated sorbitan esters, alkoxylated mannitan esters such as for example ethoxylated mannitan esters, coprah amides, N-alkylamines, amine oxides, ethylene oxide/propylene oxide block copolymers, and very particularly the ethylene oxide/propylene oxide block copolymers sold under the trade name PLURONIC™ by the company BASF, such as for example PLURONIC™ PE 6100 and PLURONIC™ PE 6200, the nonionic surfactants of formula (II):

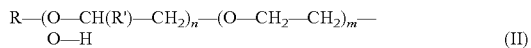

$$R—(O—CH(R')—CH_2)_n—(O—CH_2—CH_2)_m—O—H \qquad (II)$$

in which R represents a linear or branched, saturated or unsaturated, hydrocarbon-based aliphatic radical comprising from 8 to 36 carbon atoms, R' represents a methyl or ethyl radical, n represents an integer greater than or equal to 0 and less than or equal to 150, m represents an integer greater than or equal to 0 and less than or equal to 150, it being understood that the sum n+m is greater than 0, the defoaming nonionic surfactants of formula ($A_1$):

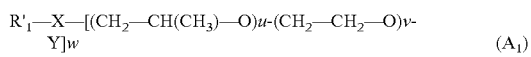

$$R'_1—X—[(CH_2—CH(CH_3)—O)u-(CH_2—CH_2—O)v-Y]w \qquad (A_1)$$

in which:
$R'_1$ represents a linear or branched, saturated or unsaturated, hydrocarbon-based aliphatic radical comprising from 6 to 18 carbon atoms,
X represents a nitrogen atom or an oxygen atom,
v represents an integer between 1 and 50,
u represents an integer between 1 and 50,
w represents an integer equal to 1 if X represents an oxygen atom, and w represents an integer equal to 1 or 2 if X represents a nitrogen atom,
Y represents a blocking functional group chosen from the elements from the group consisting of linear alkyl radicals comprising from 4 to 8 carbon atoms, such as for example the butyl radical, the benzyl radical or a butylene oxide group.

Among the defoaming nonionic surfactants of formula ($A_1$), mention may be made of the products sold under the trade name TERGITOL™ by the company DOW CHEMICAL such as for example TERGITOL™ L61E and TERGITOL™ L64E.

Among the anionic surfactants included in the aqueous composition ($C_1$), mention will particularly be made of the salts of alkali metals, the salts of alkaline-earth metals, ammonium salts, amine salts, amino alcohol salts of the following compounds: alkyl ether sulfates, alkyl sulfates, alkylamido ether sulfates, alkylaryl polyether sulfates, monoglyceride sulfates, α-olefin sulfonates, paraffin sulfonates, alkyl phosphates, alkyl ether phosphates, alkyl sulfonates, alkylamide sulfonates, alkylaryl sulfonates, alkyl carboxylates, alkyl sulfosuccinates, alkyl ether sulfosuccinates, alkylamide sulfosuccinates, alkyl sulfoacetates, alkyl sarcosinates, acyl isethionates, N-acyl taurates, and acyl lactylates. Among the anionic surfactants, mention will also be made of lipoamino acids other than those of formula (I) as defined previously, for example lipoproteins, lipopeptides, derivatives of lipoproteins, derivatives of proteins, salts of fatty acids and salts of optionally hydrogenated coprah oil acids.

Among the amphoteric surfactants included in the aqueous composition ($C_1$), mention will particularly be made of alkyl betaines, alkylamido betaines, sultaines, alkylamidoalkyl sulfobetaines, derivatives of imidazolines, phosphobetaines, amphopolyacetates and amphopropionates.

Among the cationic surfactants included in the aqueous composition ($C_1$), mention will particularly be made of quaternary ammonium derivatives.

According to one more particular aspect of the present invention, the subject thereof is the process as defined previously, for which the aqueous composition ($C_1$) also comprises at least one surfactant chosen from:
alkyl polyglycosides of formula ($A_2$):

$$R_2—O—(S)_q—H \qquad (A_2)$$

in which S represents the residue of a reducing sugar chosen from the elements of the group consisting of glucose, xylose and arabinose, $R_2$ represents a linear or branched, saturated hydrocarbon-based radical comprising from 8 to 16 carbon atoms and q represents a decimal number greater than or equal to 1.05 and less than or equal to 5;
alkyl ether sulfates of formula ($A_3$):

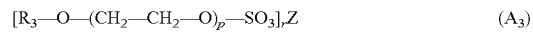

$$[R_3—O—(CH_2—CH_2—O)_p—SO_3]_rZ \qquad (A_3)$$

in which $R_3$ represents a linear or branched, saturated or unsaturated, aliphatic hydrocarbon-based radical comprising from 6 to 22 carbon atoms, p represents a decimal number between 1 and 10, preferably between 2 and 4, r represents an integer equal to 1 or to 2 and Z represents the cation of an alkali metal or of an alkaline earth metal, the ammonium ion, the hydroxyl-ethylammonium ion or the tri(hydroxyethyl) ammonium ion.
N-acyl glycines of formula ($A_4$):

$$R_4—C(O)—NH—CH_2—COOH \qquad (A_4)$$

in which the $R_4$—(C=O)— radical represents a radical chosen from the n-octanoyl, n-decanoyl, n-dodecanoyl, n-tetradecanoyl, n-hexadecanoyl, n-octadecanoyl and cocoyl radicals. More particularly, the N-acyl glycines of formula ($A_4$) are dodecanoyl glycine and cocoyl glycine.

According to this particular aspect of the process as defined previously, the total proportion by weight of said surfactant different from the compound of formula (I) is more particularly less than the total proportion by weight of said compound of formula (I).

According to one particular aspect of the process as defined previously, the aqueous composition ($C_1$) also comprises, for 100% of its weight, from 0.5% by weight to 10% by weight of N-cocoylglycine or of N-dodecanoylglycine.

The aqueous composition ($C_1$) used in the process that is the subject of the present invention optionally comprises ingredients customarily used in the field of drilling processes such as solvents, rheology modifiers, clay inhibitors intended to inhibit the swelling of the clays in contact with water and lubricants.

As examples of solvents optionally present in the aqueous composition ($C_1$) used in the process that is the subject of the present invention, there is glycerol, dipropylene glycol, hexylene glycol, 1,2-propanediol, 1,3-propylene glycol, monopropylene glycol, DMSO or liquid polysaccharides.

As examples of rheology modifiers optionally present in the aqueous composition ($C_1$), used in the process that is the subject of the present invention, there are polymeric hydrocolloids of plant or biosynthetic origin, such as for example xanthan gum, gum karaya, carrageenates, alginates, galactomannans, cellulose and its derivatives; starch and its hydrophilic derivatives; the polymers prepared from acrylic acid and/or from its derivatives, from acrylamide and/or from its derivatives, from methacrylic acid and/or from its derivatives, from vinyl alcohol and/or its derivatives.

As examples of clay inhibitors optionally present in the aqueous composition ($C_1$), used in the process that is the subject of the present invention, there are polyethylene glycols having a molecular weight between 400 g·mol$^{-1}$ and 10 000 g·mol$^{-1}$, polyglycerols, alkoxylated alcohols such as, for example, the ethoxylated butanol sold by the company Uniqema under the trade name Kernelix™ 7423X.

As examples of lubricants optionally present in the aqueous composition ($C_1$), used in the process that is the subject of the present invention, there are ethoxylated plant oils, such as for example the ethoxylated castor oils sold under the trade name SEPITER™ 030, SEPITER™ 100, SEPITER™ 200 and SEPITER™ 300 by the company SEPPIC; the methyl esters of ethoxylated fatty acids; the soaps of fatty acids such as for example sodium stearate.

Another subject of the invention is a drilling process as defined previously, in which said disposing step is preceded by, or carried out at the same time as, a step of fracturing the rock by spraying said drilling fluid in the form of foam.

According to this particular aspect of the present invention, the aqueous composition ($C_1$) as defined previously generally comprises ingredients used for the preparation of fluids for fracturing rock in oil and/or gas drilling processes, such as for example sand, glass beads and nutshells.

The aqueous fluid used in this particular aspect of the process that is the subject of the present invention is prepared level with the wellhead using a suitable device. The foam obtained is then introduced under high pressure into the well and sprayed onto the rock formation to be fractured. Following this introduction, the well is sealed until a stable pressure is obtained inside the well. The well is then opened to enable the gradual reduction of the pressure inside the well, then entailing the rise to the surface of the foam which carries with it the rock cuttings generated by the preceding fracturing step, which are then subsequently separated from the foam in order to be disposed of.

The foam of the aqueous fluid used in the process that is the subject of the present invention is stable and has improved mechanical characteristics. The stability and the mechanical characteristics of the foams are evaluated respectively by measuring the half-life and by measuring the consistency of said foams. The half-life is the time at the end of which the foam obtained from a certain volume of foaming solution has been drained of an amount of solution corresponding to half of the initial volume of the solution. The consistency of the foam is expressed by a relative value obtained by measuring the rheological characteristics of the foam using a rotating disk viscometer. The following examples illustrate the invention, without however limiting it.

1) Preparation of Foaming Compositions 1.1) Preparation of a Solution Comprising Disodium N-Cocoyl Glutamate (Composition $X_1$).

Introduced into a reactor, with stirring and at a temperature of 20° C., are 21.1 kg of a water/acetone mixture (water/acetone weight ratio: 7/3), 7.0 kg of monosodium glutamate monohydrate, and then 5.6 kg of a 25% by weight aqueous solution of sodium hydroxide so as to achieve a pH equal to 12.

Added gradually with stirring are 6.9 kg of cocoyl chloride and an additional 5.4 kg of the sodium hydroxide solution in order to maintain the pH at 12. The temperature is maintained between 20° C. and 30° C., then the pH is decreased down to 2 by adding 15.6 kg of a 30% by weight aqueous solution of sulfuric acid. The acidic aqueous phase is then separated from the solid obtained and this solid is washed copiously with water. The wet solid obtained is then dissolved in 8.3 kg of a 25% sodium hydroxide solution to which 8.2 kg of water is added. The solution of disodium N-cocoyl glutamate (Composition $X_1$) thus obtained is emptied out into drums.

1.2) Preparation of a Solution Comprising N-Cocoyl Glutamate, N-Cocoyl Aspartate and N-Cocoyl Glycinate (Composition $X_2$).

An aqueous solution is prepared containing 23% by weight of a molar equivalent of a mixture of amino acids comprising, for 100% of its weight, 88.7% by weight of aspartic acid, 4.9% by weight of glutamic acid and 6.4% by weight of glycine introduced into a reactor, with stirring and at a temperature of 20° C. The pH is adjusted to 9.8 by then adding an aqueous sodium hydroxide solution.

Next, added gradually, with stirring, are 0.8 molar equivalent of cocoyl chloride, and sodium hydroxide solution in order to maintain the pH between 9.5 and 10. The expected solution of the mixture of sodium N-cocoyl glutamate, sodium N-cocoyl aspartate and sodium N-cocoyl glycinate (Composition $X_2$) is thus obtained.

The analytical characteristics of the compositions ($X_1$) and ($X_2$) are recorded in table 1 below (the percentages are weight percentages).

TABLE 1

|  | Method | ($X_1$) | ($X_2$) |
|---|---|---|---|
| Appearance at 20° C. | Visual method | Clear liquid | Clear liquid |
| Water content (a) | Standard NFT 73-201 | 74.5% | 68.4% |
| Solids content (b) | Thermo balance, 105° C., 100 minutes | 26.1% | 31.6% |
| Residual dodecanoic acid (c) | Gas chromatography | 1.5% | 2.8% |
| Sodium content (%) | Atomic absorption | 3.00% | Not measured |
| Content of compounds of formula (I) | (b)-(c) | 24.6% | 28.8% (including approximately 1% of cocoyl glycinate) |
| Chlorides | Potentiometric analysis with silver nitrate | 0.01% | 2.45% |
| Product pH | pH meter | 6.6 | 9.5 |

1.3) Preparation of a Foaming Composition ($X_3$) According to the Prior Art in the Presence of Foam Stabilizers A composition ($X_3$) is prepared by simple mixing, at a temperature of 20° C., of the following ingredients:

| | |
|---|---|
| Hexadecanol: | 1.8% |
| Lauryl amine: | 0.3% |
| Butyl glycol: | 11.2% |
| Isobutanol: | 6.1% |
| Sodium lauryl ether sulfate C10-C12 + 1 EO: | 16.0% |
| Sodium lauryl ether sulfate C12-C16 + 2.2 EO: | 12.4% |
| Water | qs for 100%. |

The composition ($X_3$) thus prepared comprises a content of 28.4% by weight of foaming agents (sodium lauryl ether sulfate C10-C12+1 EO and sodium lauryl ether sulfate C12-C16+2.2 EO) and also a foam stabilization system consisting of hexadecanol and laurylamine. The weight ratio (sodium lauryl ether sulfate C10-C12+1 EO)/(sodium lauryl ether sulfate C12-C16+2.2 EO) is equal to 1.29; the content of surface active material, consisting of sodium lauryl ether sulfate C10-C12+1 EO and of sodium lauryl ether sulfate C12-C16+2.2 EO is 28.4% by weight.

1.4) Preparation of a Foaming Composition ($X_4$) According to the Prior Art without Foam Stabilizers A composition ($X_4$), free of foam stabilizing ingredients, is prepared by simple mixing, at a temperature of 20° C., of the following ingredients:

| | |
|---|---|
| Sodium lauryl ether sulfate C10-C12 + 1 EO: | 23.8% |
| Sodium lauryl ether sulfate C12-C16 + 2.2 EO: | 18.5% |
| Water | qs for 100%. |

The weight ratio (sodium lauryl ether sulfate C10-C12+1 EO)/(sodium lauryl ether sulfate C12-C16+2.2 EO) is equal to 1.29; the content of surface active material, consisting of sodium lauryl ether sulfate C10-C12+1 EO and of sodium lauryl ether sulfate C12-C16+2.2 EO, is 42.3% by weight.

2) Evaluation of the Foaming Properties of Compositions ($X_1$), ($X_2$), ($X_3$), ($X_4$), ($X_5$) and ($X_6$)

Aqueous solutions are prepared so as to obtain solutions containing 0.6% by weight of surface active material in WHO hard water from compositions ($X_1$), ($X_2$), ($X_3$) and ($X_4$). For a volume of 1 liter, WHO hard water consists of:

0.304 g of anhydrous calcium chloride
0.139 g of magnesium chloride hexahydrate
qs for 1 liter of deionized water.

WHO hard water corresponds to a degree of hardness of 34° Th.

The same aqueous solutions (of the prior art) are prepared with 0.6% by weight of surface active material from alkyl polyglucosides having an alkyl chain that comprises from 8 to 10 carbon atoms ($X_5$) and from alkyl polyglucosides having an alkyl chain that comprises from 10 to 14 carbon atoms ($X_6$).

2.1) Principle of the Method for Evaluating the Half-Life and the Consistency of a Foam The evaluation of the half-life and of the consistency of a foam is carried out by forming a foam, from a solution of WHO hard water comprising a content of 0.6% by weight of foaming surfactants, by mechanical stirring at a temperature of 20° C.

2.2) Experimental Protocol

Accurately weighed in a 50 cm$^3$ beaker is the required amount of the composition to be tested so as to obtain a solution of 0.6% by weight of foaming surfactants, present in the composition to be tested, in a solution of 250 cm$^3$ of WHO hard water. Added next to the 50 cm$^3$ beaker is a portion of WHO hard water comprising the composition to be tested and it is stirred manually and slowly so as to dissolve the composition to be tested in the WHO hard water. The contents of the 50 ml beaker are poured into a 500 cm$^3$ graduated beaker, and topped up by the addition of WHO hard water so as to reach the 250 cm$^3$ filling mark. The solutions present in the 500 cm$^3$ beaker are stirred by means of a Rayneri (model 33/300) laboratory motor equipped with a butterfly blade having three hollow arms (diameter 80 mm). The blade is placed a few millimeters from the bottom of the beaker containing the solution of the compositions to be tested in the WHO hard water and is operated with a constant speed of 3000 rpm for 2 minutes.

2.3) Expression of the Results

For each test, the following parameters are measured:

Expansion time ($T_{exp}$): this is the stirring time at the end of which the elimination of the vortex in the beaker is observed. Beyond this time, the foam completely surrounds the shaft of the blade and its level is horizontal.

Half-life ($T_{1/2}$): this is the time at the end of which the foam obtained from a certain volume of foaming solution has been drained of an amount of solution corresponding to half of the initial volume. For this test, the half-life is reached when the upper level of the drainage water reaches the 125 cm$^3$ line on the beaker.

Foam height generated by stirring ($H_{to}$): this is the foam height generated after stirring for 2 minutes.

Residual foam height after 30 minutes ($H_{t30}$): this is the foam height observed after a period of 30 minutes following the end of the 2 minutes of stirring.

The difference ($\Delta H$) between $H_{to}$ and $H_{t30}$ makes it possible to comparatively evaluate the quality of the foams generated by the various surfactants.

Consistency of the foam: this is the value of the viscosity measured on the foam generated at a given time, using a Rheovisco RV 8 viscometer equipped with a No. 3 rotating disk module.

2.4) Results Obtained

The results obtained for the solutions containing 0.6% by weight of foaming surfactants in WHO hard water for compositions ($X_1$), ($X_2$), ($X_3$), ($X_4$), ($X_5$) and ($X_6$) are indicated in table 2 below.

TABLE 2

| | | | | | | Viscosity in mPa · s | | |
|---|---|---|---|---|---|---|---|---|
| | ($T_{exp}$) | ($T_{1/2}$) | ($H_{to}$) | ($H_{t30}$) | ($\Delta H$) | at t = 0 | at t = 30 min | at ($T_{1/2}$) |
| ($X_1$) | 8 s | 4.000 s | 160 cm | 160 cm | 0 cm | 9.610 | 12.930 | 15.880 |
| ($X_2$) | 8 s | 3.050 s | 160 cm | 155 cm | 5 cm | 8.920 | 7.590 | 8.190 |
| ($X_3$) | 8 s | 2.100 s | 180 cm | 170 cm | 10 cm | 3.400 | 8.200 | 8.300 |

TABLE 2-continued

|      | $(T_{exp})$ | $(T_{1/2})$ | $(H_{to})$ | $(H_{t30})$ | $(\Delta H)$ | Viscosity in mPa·s at t = 0 | at t = 30 min | at $(T_{1/2})$ |
|------|-------------|-------------|------------|-------------|--------------|-----------------------------|---------------|----------------|
| $(X_4)$ | 8 s | 350 s | 200 cm | 160 cm | 40 cm | 910 | 3.200 | 800 |
| $(X_5)$ | 8 s | 600 s | 190 cm | 155 cm | 35 cm | 2.000 | 1.900 | 1.700 |
| $(X_6)$ | 14 s | 600 s | 175 cm | 150 cm | 25 cm | 2.500 | 2.600 | 1.800 |

2.5) Analyses of the Results

The results set out in the preceding table reveal that the foams obtained from composition ($X_1$), comprising disodium N-cocoyl glutamate and in the absence of foam stabilizing agents, and from composition ($X_2$), comprising a mixture of N-cocoyl glutamate, N-cocoyl aspartate and N-cocoyl glycinate, display an improved stability and better mechanical properties than composition ($X_3$), comprising foaming surfactants and foam stabilizing agents, than composition ($X_4$), comprising foaming surfactants without foam stabilizing agents and than compositions ($X_5$) and ($X_6$) based on alkyl polyglucosides, used in the drilling processes of the prior art.

The invention claimed is:

1. A process for drilling cavities in subterranean formations comprising a step of disposing of the drill cuttings using an aqueous fluid, in the form of a foam, obtained by mixing:
   an aqueous composition ($C_1$) comprising, for 100% by weight:
      from 0.5% by weight to 25% by weight of a compound of formula (I):

$$R_1-C(O)-NH-CH(COOM)-(CH_2)_n-COOM' \quad (I)$$

in which n represents an integer equal to 2, $R_1$ represents an alkyl radical chosen from heptyl, nonyl, undecyl, tridecyl or pentadecyl, M represents a monovalent cation and M', which is identical to or different from M, represents a hydrogen atom or a monovalent cation; or a mixture of compounds of formula (I), and
      from 75% to 99.5% by weight of water,
   with a gas or a mixture of gases, chosen from air, nitrogen or carbon dioxide.

2. The process as claimed in claim 1, wherein the aqueous composition ($C_1$) further comprises a non-zero proportion of at least one compound of formula (I), wherein n is equal to 1.

3. The process as claimed in claim 1, wherein the aqueous composition ($C_1$) comprises, for 100% by weight:
   from 0.5% by weight to 25% by weight of a mixture of compounds of formula (I):

$$R_1-C(O)-NH-CH(COOM)-(CH_2)_n-COOM' \quad (I)$$

said mixture being obtained by acylation of a compound of formula (II):

$$NH_2-CH(COOM)-(CH_2)_n-COOM' \quad (II)$$

wherein n represents an integer equal to 1 or 2, M represents a monovalent cation and M', which is identical to or different from M, represents a hydrogen atom or a monovalent cation, with a mixture of fatty acids derived from coconut oil or with a mixture of activated derivatives of said acids; and
   from 75% to 99.5% by weight of water.

4. The process as claimed in claim 1, wherein, in the formula (I), M represents a sodium or potassium atom or M' represents a hydrogen atom.

5. The process as claimed in claim 1, wherein, in the formula (I), M and M' represent a sodium atom or a potassium atom.

6. The process as claimed in claim 4, wherein the mixture of compounds of formula (I) is chosen from the monosodium salt or monopotassium salt of N-cocoylglutamic acid, or the monosodium salt or monopotassium salt of N-cocoylaspartic acid.

7. The process as claimed in claim 5, wherein the mixture of compounds of formula (I) is chosen from the disodium salt or dipotassium salt of N-cocoylglutamic acid, or the disodium salt or dipotassium salt of N-cocoylaspartic acid.

8. The process as claimed in claim 1, wherein the aqueous composition ($C_1$) further comprises, for 100% of its weight, from 0.5% by weight to 15% by weight, of at least one surfactant different from the compound of formula (I), chosen from nonionic surfactants, anionic surfactants, cationic surfactants and amphoteric surfactants, it being understood that the total proportion by weight of said surfactant different from the compound of formula (I) is less than the total proportion by weight of said compound of formula (I).

9. The process as claimed in claim 8, wherein the aqueous composition ($C_1$) further comprises, for 100% of its weight, from 0.5% by weight to 10% by weight of N-cocoylglycine or of N-dodecanoylglycine.

10. The drilling process as claimed in claim 1, wherein said disposing step is preceded by, or carried out at the same time as a step of fracturing the rock by spraying said drilling fluid in the form of foam.

11. The process as claimed in claim 1, wherein the aqueous composition ($C_1$) further comprises, for 100% of its weight, from 0.5% by weight to 10% by weight, of at least one surfactant different from the compound of formula (I), chosen from nonionic surfactants, anionic surfactants, cationic surfactants and amphoteric surfactants, it being understood that the total proportion by weight of said surfactant different from the compound of formula (I) is less than the total proportion by weight of said compound of formula (I).

* * * * *